(12) United States Patent
Benarous

(10) Patent No.: US 11,584,350 B2
(45) Date of Patent: Feb. 21, 2023

(54) BRAKE PLATE WEAR DETECTION USING SOLENOID CURRENT SIGNATURE

(71) Applicant: Goodrich Actuation Systems Limited, Solihull (GB)

(72) Inventor: Maamar Benarous, Balsall Common (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 817 days.

(21) Appl. No.: 16/512,444

(22) Filed: Jul. 16, 2019

(65) Prior Publication Data
US 2020/0086845 A1 Mar. 19, 2020

(30) Foreign Application Priority Data
Sep. 19, 2018 (EP) .................................. 18275145

(51) Int. Cl.
*B60T 17/22* (2006.01)
*F16D 66/02* (2006.01)
*F16D 65/12* (2006.01)

(52) U.S. Cl.
CPC .......... *B60T 17/221* (2013.01); *F16D 66/028* (2013.01); *F16D 65/12* (2013.01)

(58) Field of Classification Search
CPC ....... B60T 17/221; F16D 66/028; F16D 65/12
See application file for complete search history.

(56) References Cited

U.S. PATENT DOCUMENTS

| 9,803,712 | B2 | 10/2017 | Jantunen |
| 9,964,166 | B2 * | 5/2018 | Staahl ................. F16D 55/2255 |
| 2003/0061872 | A1 * | 4/2003 | Giessler .................. G01L 5/28 |
| | | | 73/121 |

(Continued)

FOREIGN PATENT DOCUMENTS

| CA | 3031711 A1 | 3/2018 |
| CN | 204784313 U | 11/2015 |

(Continued)

OTHER PUBLICATIONS

Translation of the description of Chinese Patent No. CN 108167356 obtained from website: https://worldwide.espacenet.com obtained on May 2, 2022.*

(Continued)

*Primary Examiner* — Pamela Rodriguez
(74) *Attorney, Agent, or Firm* — Cantor Colburn LLP

(57) ABSTRACT

A method for monitoring the health of a brake plate having a solenoid with a solenoid air gap includes creating a reference solenoid current profile for the brake plate solenoid air gap, by: calculating a nominal solenoid current profile based on the air gap under nominal conditions, calculating a upper and lower limit of the nominal solenoid current profile, based on an impact of at least one external variation and/or tolerance of the brake plate, and creating the reference solenoid current profile by combining said upper and lower limits into the nominal solenoid current profile. The method also includes generating and measuring a solenoid current curve of the brake plate and determining if said generated curve of the brake plate is between said upper and lower limits to determine that the brake plate is healthy.

8 Claims, 3 Drawing Sheets

(56) References Cited

U.S. PATENT DOCUMENTS

2019/0263376 A1\* 8/2019 Ihle .................. B62B 5/048

FOREIGN PATENT DOCUMENTS

| | | |
|---|---|---|
| CN | 108167356 A | 6/2018 |
| DE | 202005009053 U1 | 8/2005 |
| GB | 2292429 A | 2/1996 |
| JP | 2007040975 A | 2/2007 |
| WO | 2017191601 A1 | 11/2017 |
| WO | 2018054545 A1 | 3/2018 |

OTHER PUBLICATIONS

Translation of the claims of Chinese Patent No. CN 108167356 obtained from website: https://worldwide.espacenet.com obtained on May 2, 2022.\*
Extended European Search Report for International Application No. 18275145.3 dated Apr. 3, 2019, 8 pages.

\* cited by examiner

BRAKE PLATE WEAR DETECTION USING SOLENOID CURRENT SIGNATURE

FOREIGN PRIORITY

This application claims priority to European Patent Application No. 18275145.3 filed Sep. 19, 2018, the entire contents of which are incorporated herein by reference.

FIELD

The present disclosure relates to a system and method for detecting brake plate wear.

BACKGROUND

Brake plates wear through use. There are a number of different ways by which this wear can be monitored. For example, U.S. Pat. No. 9,803,712 B2 describes a method of monitoring a brake and in doing so, obtaining information on the condition of the brake. The document describes using a magnetizing means and first and second braking surfaces. When an electric current is applied to the magnetizing means, this moves the braking surfaces to an open state wherein the braking surfaces are no longer connected to each other. The method comprises determining the electric current of the magnetizing means as these braking surfaces move apart and further comprises determining a maximum electric current of the magnetizing means of the brake when in the open state. The method then determines the condition of the braking surface as a current ratio from the electric current measured as the braking surfaces start to move to a maximum electric current.

WO 2018/054545 A1 describes a method for monitoring an electromagnetically actuatable brake which has an energizable coil that interacts with a solenoid arranged in a linearly movable manner. The current flowing through the coil is detected, and the detected current is fed to an analysis unit. The voltage applied to the coil is increased during particular periods of time and the current curve produced determines the position of the solenoid relative to the coil. This determined position is used to determine whether the brake is in the engaged state or released state.

SUMMARY

A method is described herein for monitoring the health of a brake plate having a solenoid with a solenoid air gap, said method comprising creating a reference solenoid current profile for said brake plate solenoid air gap, by: calculating a nominal solenoid current profile based on said air gap under nominal conditions, calculating an upper and lower limit of said nominal solenoid current profile, based on an impact of at least one external variation and/or tolerance of said brake plate, and creating said reference solenoid current profile by combining said upper and lower limits into said nominal solenoid current curve, said method for monitoring the health of said brake plate further comprising: generating and measuring a solenoid current profile of said brake plate and determining if said generated curve of said brake plate is between said upper and lower limits of said reference solenoid current profile.

In some examples, if said generated curve of said brake plate is determined as being between said upper and lower limits, determining that said brake plate is healthy.

In some of the examples described herein, if the generated curve of the brake plate is determined as not being between the upper and lower limits, then the brake plate is determined as not being healthy. In some cases a warning may therefore be generated to indicate that the brake plate should be changed or repaired.

In some examples, the external variation may comprise a variation in the environment of the brake plate, such as the temperature, humidity, etc.

In some examples, the external variation may additionally, or alternatively, be a variation in voltage supplied to the brake plate.

A computer readable storage medium may be provided that comprises instructions which, when executed by the computer, cause the computer to carry out any of the methods described herein.

A controller is also described herein that is configured to carry out these methods.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The examples described herein relate to a method and device that is configured to detect brake plate wear.

The wear and tear of brake plates needs to be monitored in order to maintain the safety of braking systems in some conditions. Solenoids are already known to be used to engage and release brakes within actuators. The examples described herein use these already existing solenoids to monitor and assess brake plates' usage and wear.

Figure 1:
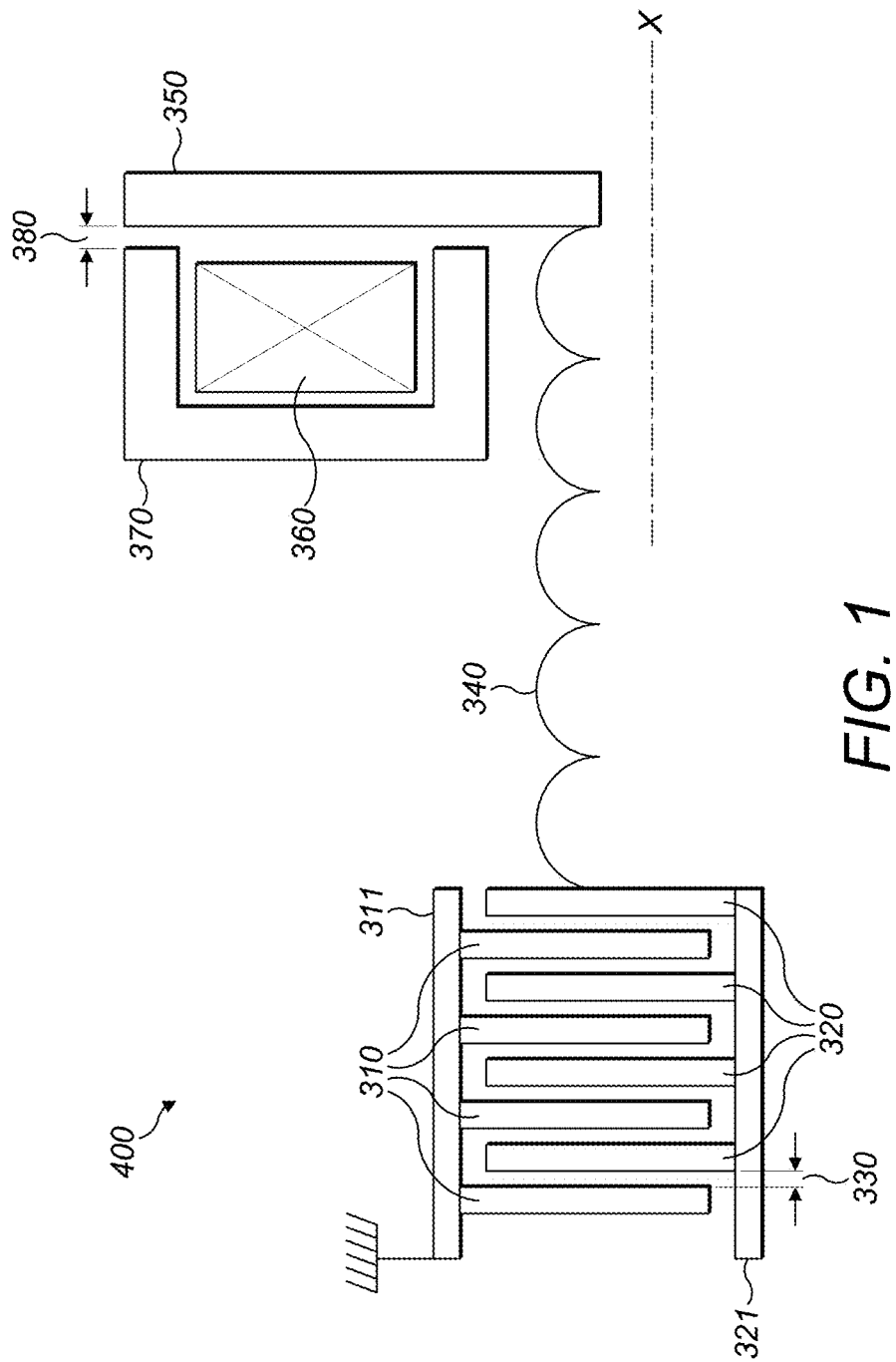
FIG. 1 depicts part of a braking system that comprises a solenoid.

FIG. 1 shows some of the features of a braking system. A first plurality of brake plates 310 are provided, which are static and do not move. These brake plates 310 are fixed at one end to a first back plate 311. A second plurality of brake plates 320 are also provided, which do move. These second brake plates 320 are also fixed at one end to a second back plate 321. X defines the center of symmetry for the brake plates. The first and second brake plates extend from their respective back plates in the direction of the other back plate, as shown in FIG. 1. The first and second brake plates are also positioned relative to each other so as to alternate. That is, a first brake plate is positioned between two second brake plates and vice versa. A brake plate gap 330 is provided between each of the adjacent first and second brake plates.

A spring 340 is provided to extend from the second plurality of brake plates 320 (i.e. those which move) to a solenoid 400, and specifically to the solenoid armature 350. The solenoid armature 350 faces a solenoid coil 360 which is provided inside a solenoid core 370. A solenoid air gap 380 is formed between the surface of the solenoid armature 350 and the solenoid core/coil 360, 370, as shown in FIG. 1. Although the solenoid diagram shown in FIG. 1 shows a set of brake plates that are activated by a C-core solenoid, the examples described herein are not limited to this and may be adapted to be used with any type of solenoid, e.g. flat face, conical face, tubular, pancake etc.

The wear of the brake plate material of the plurality of brake plates will lead to an increase of this solenoid air gap 380. The examples described herein measure and monitor this air gap 380 by monitoring the solenoid current. The examples described herein also take into account an additional factor or factors that may affect wear, such as the impact of the environment (for example temperature and/or humidity), manufacturing tolerances and voltage variations in order to monitor and detect brake plate wear.

Using the solenoid current sensor the state of the system can be monitored for given working conditions. In summary, a solenoid dynamic current profile can be calculated for a given air gap 380 under known voltage and environmental conditions. The tolerance on the air gap 380 as well as the current solenoid measurements may be used to calculate the tolerances to be defined. Once the minimum and maximum levels are determined, the reference dynamic curve with given limits can be uploaded into the memory of a processor to monitor the health of the solenoid/brake system.

Figure 2:
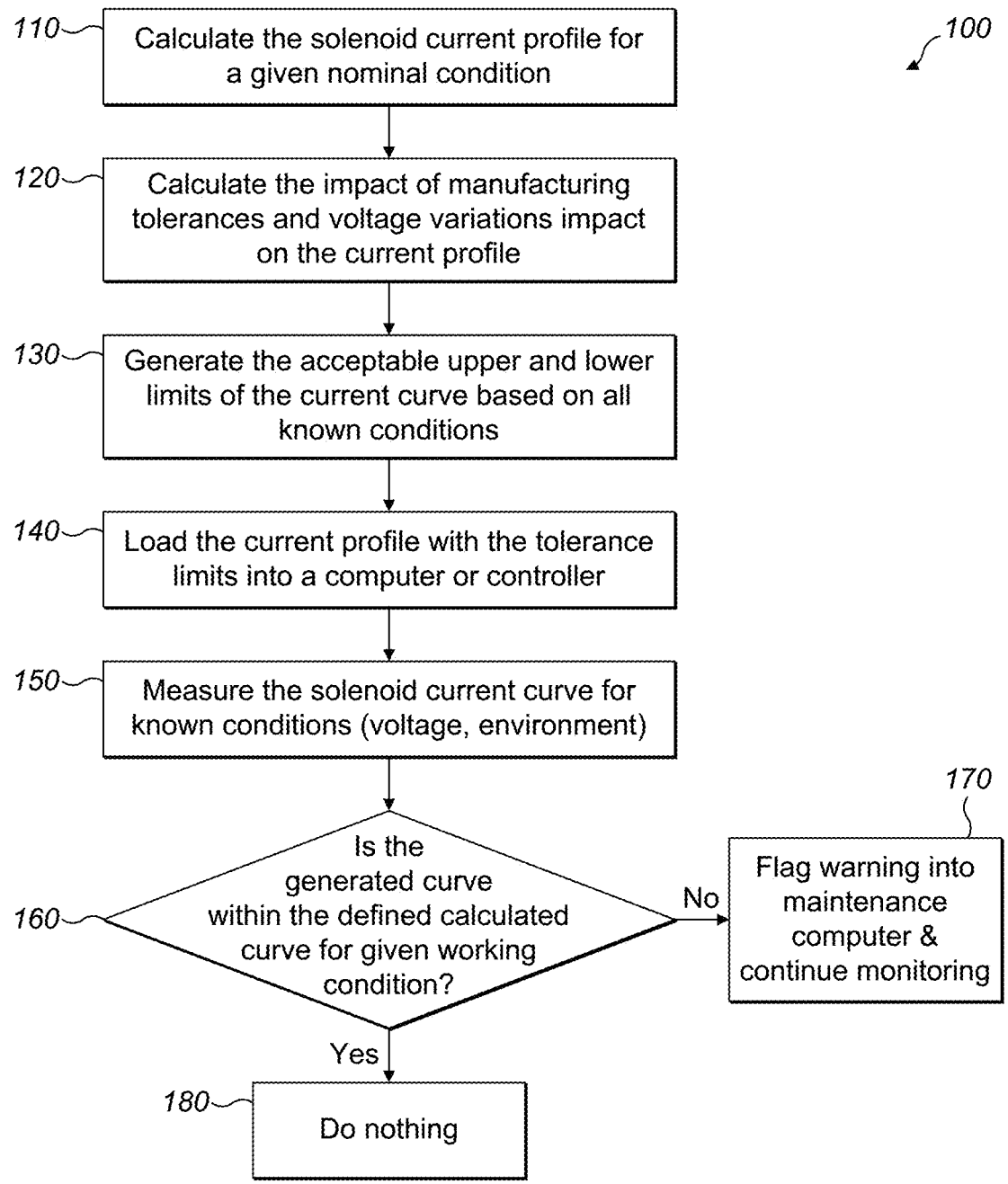
FIG. 2 illustrates an example of a new method for detecting brake plate wear.

A method for monitoring the health of a brake plate is shown in FIG. 2. The method may be performed via a controller or processor of a computer. In some examples, the method may be stored on a computer readable medium. This computer readable medium may then be used to execute the method steps as outlined below.

Figure 3:
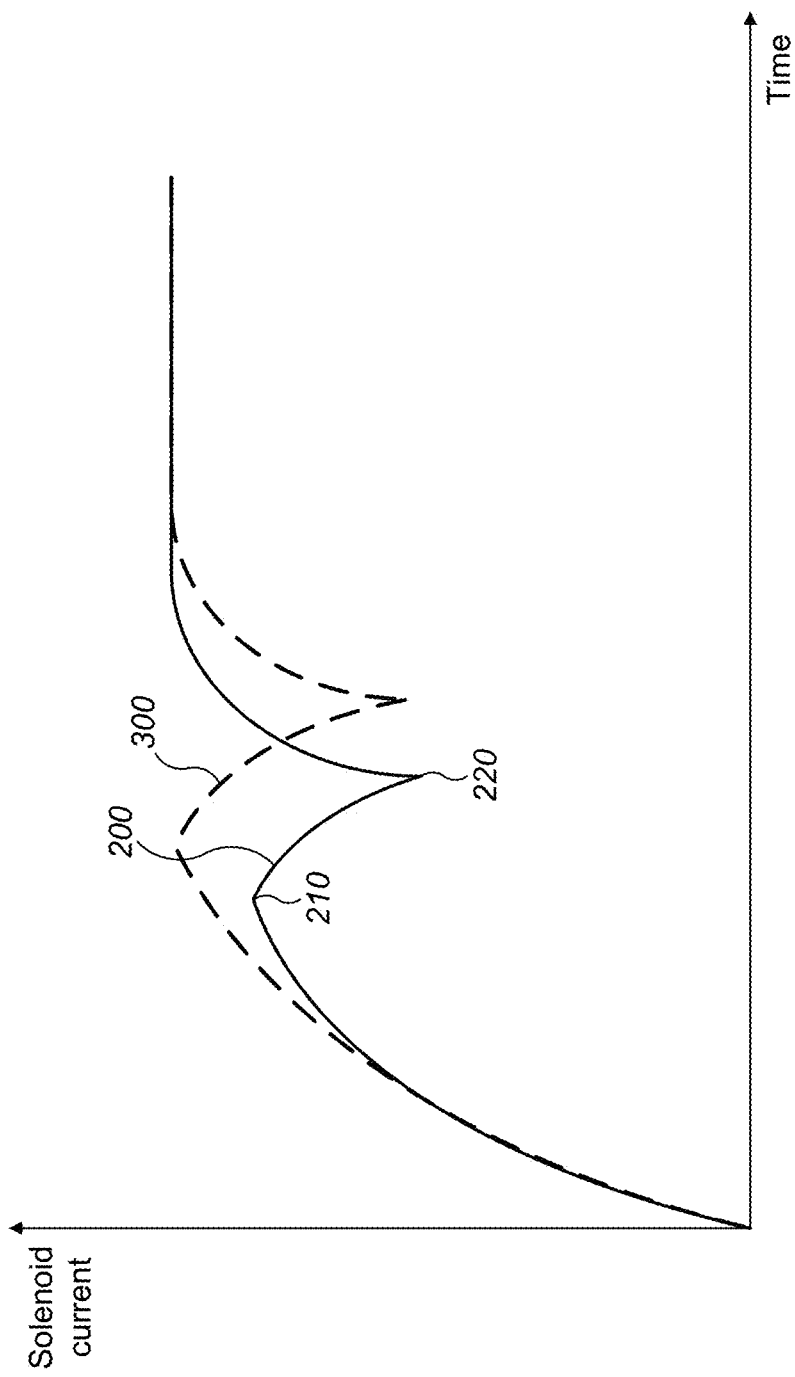
FIG. 3 depicts an example of a solenoid current profile.

The method 100 comprises, in steps 110 to 130, creating a reference current profile against which measurements can be later compared. This involves the step of first calculating a solenoid current profile for a given nominal condition 110. An example of this is shown in FIG. 3. The curve labeled 200 in FIG. 3 shows the current waveform for a new solenoid. It can be seen that the current drops momentarily at the point 210 when the solenoid armature begins to move. At the point 220, the armature has moved completely. The current waveform for the same solenoid with worn brake plates is labeled as 300 in FIG. 3 and it can clearly be seen here that the current profile differs to the profile for a new solenoid.

In many applications, the current of the solenoid may be limited or controlled in order to reduce the thermal impact. The profile will reflect the control and limits that are adopted for the application. The nominal solenoid current profile may therefore include a current control or voltage control drive. It may also comprise a solenoid driven directly from a voltage supply, where the impedance of the solenoid coil combined with the environmental conditions control the magnitude of the solenoid current.

The method further comprises the step of calculating the impact of other variable conditions such as manufacturing tolerances and/or voltage variation impact(s) on the current profile 120. The variables such as voltage variation, material tolerances, manufacturing tolerances, etc. will create an upper and lower limit that are acceptable beyond the nominal condition. These limits may be accurately defined by simulation and modeling techniques. In some examples, the impact of only one of these variables is calculated, and in others, the step calculates the impact of a plurality of these variables. Another variable that may be taken into account is the impact of the environment, such as variations in environmental temperature and/or humidity, for example. These variable conditions all create a working condition which changes the current profile.

The method then comprises the step of generating acceptable upper and lower limits of the current curve of the current profile based on these variable conditions 130 to generate the reference current profile. This reference current profile therefore includes not only the nominal current profile but also these upper and lower tolerance limits. As mentioned above, these conditions may be any or all of: manufacturing tolerances, environmental conditions at the time of use, as well as voltage variations from the power supply.

The upper and lower limits of the current are each measured under different working conditions (e.g. voltage and temperature etc.), and the impact of the manufacturing tolerances on the current profile are also assessed. By doing so, the method described herein allows for limits to be defined in the current profile beyond which the brake plate would need maintenance. This may be achieved by defining a nominal curve (or nominal current profile) and adding into the curve the upper and lower tolerances (due to the variability from manufacturing, voltage variation, environmental conditions etc.) to create a reference curve (or reference current profile, as described below). These limits therefore indicate a point beyond which a warning may be made to indicate wear to a user (as described below).

In some examples, the method may then further comprise the step of loading the reference current profile into a memory of a computer or controller 140. These reference profiles which are defined for a given condition will then constitute the reference current profile or profiles which will be later used for comparison.

The method of monitoring the wear of the brake plate(s) then comprises the steps of comparing measurements taken from the brake plates with these reference current profiles to determine whether or not the brake plate measurements fall outside a range (i.e. the range being between the upper and lower limits) that indicates that the brake plates are worn.

The method therefore further comprises the step 150 of measuring the solenoid current curve of the brake plate that is being monitored under known conditions such as voltage or environmental conditions to generate a curve 300 representing the wear state of the brake.

The method further comprises the step of 160 determining whether or not this generated curve is within the upper and lower limits (i.e. a calculated curve) of the reference current profile for a given working condition (e.g. environmental, temperature condition etc.—the working condition for each solenoid may be based on its environmental profile at the moment of use of voltage supply). For example, the controller, in conjunction with a current sensor may calculate the actual value which is compared to the stored value with its limits also included, to make the comparison as to whether or not the actual value is within the range that indicates that the brake plate is healthy. If the generated curve is not within these defined limits then a flag warning and/or alarm may be issued by the controller or processor to alert the user to this fact 170. This flag warning may result in the controller repeating the steps of the method 100 so that the health of the brake plate continues to be monitored.

If, on the other hand, the generated curve of the brake plate is within the upper and lower limits of the reference current profile, then the controller does not issue a flag warning 180 and continues to repeat the process 100. That is, the process is repeated constantly, and irrespective of whether or not a warning is generated.

The invention claimed is:
1. A method for monitoring the health of a brake plate having a solenoid with an air gap, comprising the steps of:
creating a reference solenoid current profile of said air gap, by:

calculating a nominal solenoid current profile based on said air gap under nominal conditions, calculating an upper and lower limit of said nominal solenoid current profile, based on the impact of at least one external variation and/or tolerance of said brake plate, and creating said reference solenoid current profile by including said upper and lower limits in said nominal solenoid current profile, said method for monitoring the health of said brake plate further comprising:

generating and measuring a solenoid current curve of said brake plate solenoid air gap; and determining whether said generated curve of said brake plate is between said upper and lower limits of said reference solenoid current profile, and if said generated curve of said brake plate is determined as not being between said upper and lower limits, said brake plate is determined as not being healthy;

wherein said at least one external variation comprises a variation in the environment of the brake plate and comprises a variation in external humidity or a variation in the manufacturing tolerances of the brake plate.

2. The method of claim 1, wherein, if said generated curve of said brake plate is determined as being between said upper and lower limits, determining that said brake plate is healthy.

3. The method of claim 2, wherein a warning is generated when said brake plate is determined as not being healthy.

4. The method of claim 1, wherein said at least one external variation further comprises a variation in environmental temperature.

5. The method of claim 1, wherein said at least one external variation comprises a variation in voltage supplied to the brake plate.

6. The method of claim 1, wherein said nominal conditions comprise any, one or more of the following: voltage supply, material properties and environmental conditions.

7. A computer readable storage medium comprising instructions which, when executed by a computer, cause the computer to carry out the method of claim 1.

8. A controller configured to perform the method of claim 1.

* * * * *